(12) United States Patent
Harper

(10) Patent No.: US 6,352,086 B1
(45) Date of Patent: Mar. 5, 2002

(54) PRESSURE RELIEF NIPPLE FOR RV HOOK-UP

(76) Inventor: Joseph A. Harper, 36 Harper Rd., West Monroe, NY (US) 13167

( * ) Notice: Subject to any disclaimer, the term of this patent is extended or adjusted under 35 U.S.C. 154(b) by 0 days.

(21) Appl. No.: 09/768,544

(22) Filed: Jan. 25, 2001

(51) Int. Cl.$^7$ .................................................. F16K 5/06
(52) U.S. Cl. ..................... 137/899; 137/384.2; 137/887; 251/216; 251/152
(58) Field of Search .................. 137/899, 384.2, 137/887; 251/148, 152, 216

(56) References Cited

U.S. PATENT DOCUMENTS

| | | | | |
|---|---|---|---|---|
| 286,077 A | * | 10/1883 | Sargent | 137/384.2 |
| 1,192,870 A | * | 8/1916 | Daum | 251/216 |
| 1,534,694 A | * | 4/1925 | Deskins et al. | 137/887 |
| 1,690,183 A | * | 11/1928 | Stoughton | 251/216 |
| 1,945,760 A | | 2/1934 | Strouf | 277/67 |
| 2,785,012 A | * | 3/1957 | Frewin | 137/887 |
| 3,006,366 A | | 10/1961 | Jagusch | 137/562 |
| 3,384,338 A | * | 5/1968 | Dermody | 251/216 |
| 5,293,903 A | * | 3/1994 | Appelwick | 137/887 |
| 5,390,691 A | | 2/1995 | Sproule | 137/1 |

* cited by examiner

*Primary Examiner*—A. Michael Chambers
(74) *Attorney, Agent, or Firm*—Bernhard P. Molldrem, Jr.

(57) ABSTRACT

A pressure relief device is placed in line with a water supply hose for a recreational vehicle to facilitate bleeding off back pressure when disconnecting the hose from a water hook-up. The device has a tubular nipple with a needle-valve assembly affixed onto it about midway between threaded fittings on the ends of the nipple.

8 Claims, 1 Drawing Sheet

PRESSURE RELIEF NIPPLE FOR RV HOOK-UP

BACKGROUND OF THE INVENTION

This invention relates to plumbing connections and fittings, and is more particularly concerned with devices for temporary connection of recreational vehicles to water supplies for use within the vehicle for cooking, washing, or drinking.

Many persons use recreational vehicles as a means of travel, and as a place of lodging when traveling. Such recreational vehicles may include so-called RVs, campers, travel trailers, or may be houseboats, sailboats or yachts. At each location or campsite, where the vehicle may be parked for overnight stay or longer, there is usually a fresh water hook-up, including a tap or spigot for supplying water to the vehicle. The user can connect a flexible hose, which is similar to a common garden hose, between the hook-up and a water supply inlet pipe on the vehicle, and then can turn on the water by opening a valve at the hook-up. When the time comes to depart the campsite, the user shuts off the hook-up valve and then disconnects the hose from the hook-up tap and the inlet pipe. At this time, the back pressure in the vehicle'water system remains until it is somehow relieved. If the user simply unscrews the fittings, this can result in the water spraying the user. The usual procedure to avoid this is to go into the RV or camper, open a water valve, e.g., in the sink or shower, to relieve the back pressure, and then go back outside to disconnect the hose.

A prior attempt to deal with the spraying problem when the hose is disconnected is discussed in Sproule U.S. Pat. No. 5,390,691. In that patent a special water valve is placed on the vehicle water inlet, with the water valve having a separate coupling for the supply hose. The device proposed in that patent has intersecting bores for the hose connection, the vehicle inlet connection and the water tap, so that there is a 90-degree bend in the main water flow path. Also, as the valve incorporated into the device is of standard design intended to regular use as an outdoor water tap, regular maintenance is needed, such as annual replacement of the valve washer. If this is neglected, valve failure can lead to loss of water pressure in the RV or camper. Also, where the pressure relief valve is located at the vehicle inlet end of the hose, rather than at the hook-up end, it may require first shutting off the hook-up, then walking over to the RV to bleed the hose, and then walking back to the hook-up to disconnect the hose from it.

OBJECTS AND SUMMARY OF THE INVENTION

Accordingly, it is an object of the present invention to provide a pressure relief device that avoids the drawbacks of the prior art.

It is another object to provide a pressure relief device of straightforward, simple design, with a minimum of bends, and which is reliable and simple to use.

It is a further object to provide a pressure relief device that connects to one end or the other of the water supply hose between the hook-up and the supply inlet.

It is yet another object to minimize the risk of water spraying out onto the person disconnecting the water supply hose from the water hook-up.

In accordance with one aspect of the present invention, a pressure relief device is provided for use with water supply connection for a mobile camping vehicle. A flexible water hose is connected at one end by a threaded fitting to a water hook-up and at another end to an water supply inlet of the vehicle. The a pressure relief device is placed in line with the hose for relieving back pressure when the user disconnects the hose from the water hook-up. The device includes a tubular nipple having threaded fittings on its ends to mate with corresponding fittings on the hose at one end and on one or both of said hook-up and said inlet at the other end. Preferably, these are the same diameter and thread, and can be one male and one female. A needle-valve pressure relief is affixed onto the nipple about midway between the fittings. There is an opening for fluid communication with the interior of the tubular nipple. The needle-valve pressure relief has a needle-valve seat assembly affixed onto the tubular nipple, and a needle valve with screw threads that mate with threads in the needle-valve seat The needle valve can be manually rotated into or out of closure with the seat. The needle-valve said seat structure has a pressure-relief bleed hole to direct any escaping water to one side of the needle-valve seat. This bleed hole is oriented to direct any blast of water to one side of the nipple. The nipple can also be distinctively colored on opposite sides, e.g., red on one side and white on the other, so that the user can know at a glance the direction that any water spray is likely to go.

This device can be favorably attached at the hook-up end of the hose, so that the user can bleed the back pressure from the hose, after turning off the hook-up valve, without having to move to the RV water inlet.

In a preferred embodiment, the pressure relief nipple may be brass and the valve seat may be brazed or welded onto it. The needle valve stem may have a key-type handle that is removably mounted on the end, so that the key can be removed to discourage tampering. The needle valve usually requires no maintenance and has no parts expected to exhibit wear.

The above and many other objects, features, and advantages of this invention will be more fully appreciated from the ensuing description of a preferred embodiment, which is to be read in conjunction with the accompanying Drawing.

DETAILED DESCRIPTION OF THE PREFERRED EMBODIMENT

Figures 1, 2, 3:
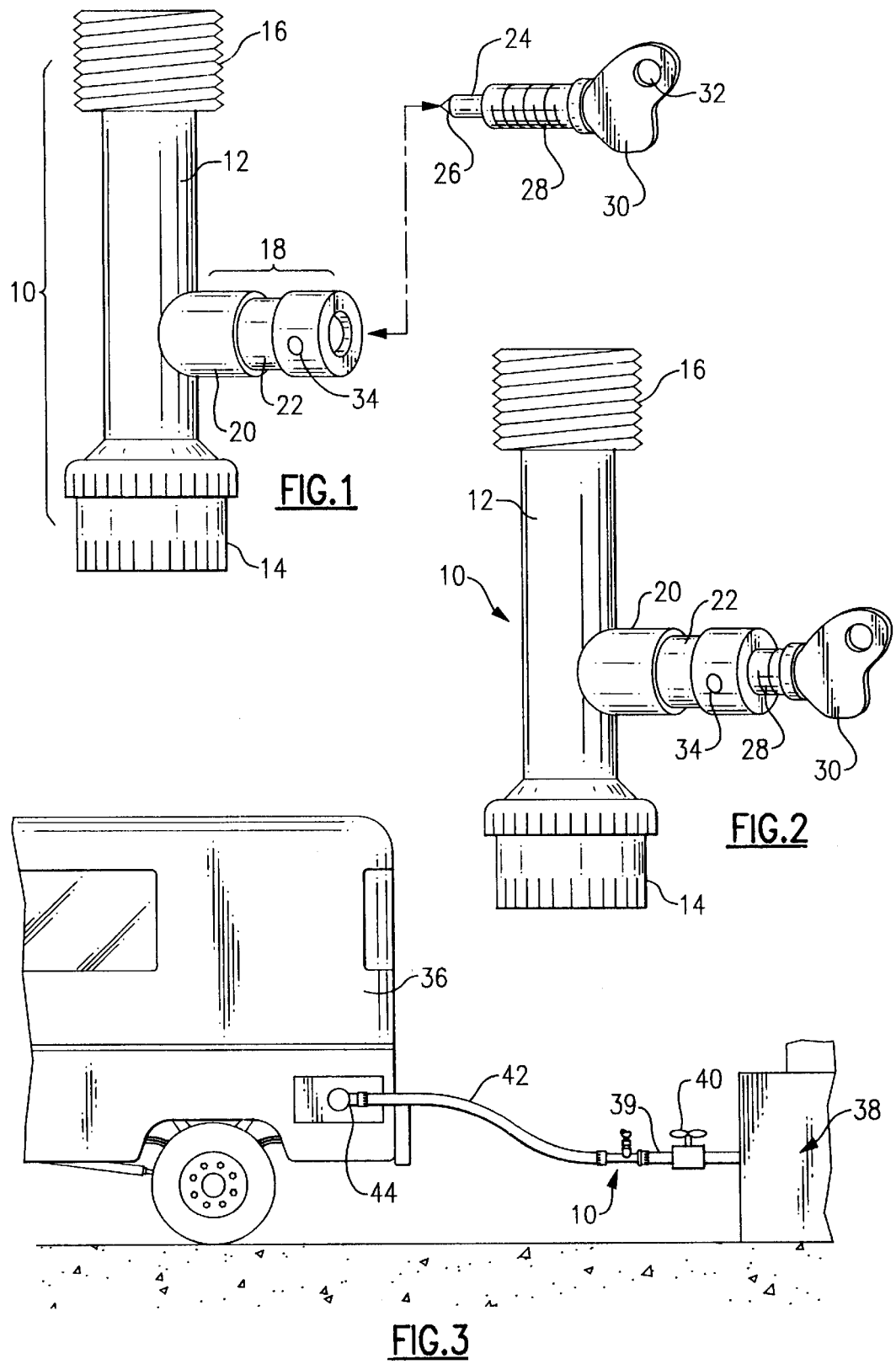
FIG. 1 is an assembly view of a pressure relief device according to an embodiment of the present invention.
FIG. 2 is a perspective view of the device.
FIG. 3 is an elevation showing the water supply hose connection for a recreational vehicle or travel trailer, employing the pressure relief device of this invention.

With reference now to the Drawing, FIGS. 1 and 2 illustrate a pressure relief device 10 according to an embodiment of this invention, here in the form of a straight tubular nipple 12 with a female threaded coupling 14 at one end and a male threaded coupling 16 at the other end. The coupling 14 has a rotatable threaded sleeve with internal threads. In this embodiment the two couplings are the same diameter and thread. A pressure relief valve 18 is affixed onto the side of the nipple 12 about midway between the two couplings 14 and 16. A tubular sleeve 20 is welded or brazed onto the nipple 12 over an opening in through the wall of the nipple, and a needle valve seat 22 is fitted into this sleeve 20. A needle valve 24, shown in better detail in FIG. 2, has a conic distal tip 26 that mates with structure in the seat 22, and a threaded shaft 28 that mates with female threads in the seat 24. A key or handle 30, which can be fixed or removable from the shaft 28, allows the user to open the valve for pressure relief and to close it. Where the key 30 is removable, the key may be retained on a lanyard or ball chain which may pass through a hole 32 therein. The key 30 may, for example, have a square socket that fits onto a square post on the proximal end of the shaft 28.

A small bleed hole 34 at an outer rim of the needle valve seat 22 allows water to escape to relieve back pressure that may be present in the RV water system. The user can rotate the key 30 a few degrees, and water under pressure will exit through the bleed hole 34. Here the hole 34 is oriented more or less in a plane perpendicular to the axis of the tubular nipple 12, and directing the escaping water generally away from the axis of the nipple and to one side of it.

The water connection incorporating the device 10 of this invention is shown in FIG. 3. Here, a recreational vehicle 36 is parked in a vehicle campsite near a water hook-up 38 that is provided at the campsite. The hook-up 38 has a water tap or spigot 39 with a standard threaded end, and a shut-off valve 40. The pressure-relief device 10 is connected to one end of a flexible water supply hose 42 between the spigot 39 and a water inlet pipe 44 on the recreational vehicle 36. The hose and pipe also have standard threaded fittings.

When the user arrives at the campsite and wants to connect the vehicle water system to the water hook-up 38, he or she simply attaches the device 10 to one end of the hose 42 and then installs the hose and device onto the inlet pipe 44 and spigot 39. Here, the device is installed at the spigot end, and this facilitates bleeding off the back pressure when the time comes for disconnecting the supply hose. Then, the user makes sure the key 30 is turned down to close the needle valve, and opens the hook-up shut-off valve 40.

When the time comes to leave the campsite, the user shuts off the valve 40, and then turns the key 30 a few degrees to allow the back pressure in the vehicle water system to bleed through the bleed hole 34. The user should stand on the side of the device 10 that is away from the bleed hole 34 so that the water exiting it will be directed away from him or her. To facilitate this, the two opposite sides of the device 10 can be painted with distinct colors, for example, red on the same side as the bleed hole 34 and white on the side away from the bleed hole.

While the needle valve in this embodiment uses a threaded shaft and key to rotate it into and out of engagement with the valve seat, other needle valve types could be employed, such as one in which the user presses a button or lever to relieve the back pressure. Also, while the recreational vehicle shown here is wheeled vehicle such as a van, camper or travel trailer, the device of this invention could be used with a houseboat, yacht, tent trailer, or other mobile system. The device 10 shown here is made of brass, but the invention is not limited to such materials.

While the invention has been described with reference to a specific preferred embodiment, the invention is certainly not limited to that precise embodiment. Rather, many modifications and variations will become apparent to persons of skill in the art without departure from the scope and spirit of this invention, as defined in the appended claims.

I claim:

1. In a water supply connection for a mobile camping vehicle in which a flexible water hose is connected at one end by a threaded fitting to a water hook-up and at another end to an water supply inlet of the vehicle; the improvement which comprises a pressure relief device placed in line with said hose for relieving back pressure when a user disconnects said hose from said water hook-up, the device including a generally straight tubular nipple, the nipple having a generally straight internal flow path without sharp bends or restrictions, and having threaded fittings on ends thereof to mate with corresponding fittings on the hose at one end and on one or both of said hook-up and said inlet at the other end; and a needle-valve pressure relief affixed onto said nipple between said fittings and communicating to the interior flow path of said nipple, the needle-valve pressure relief including a needle-valve seat affixed onto said nipple, and a needle valve threadably fitted into said needle-valve seat and which may be manually rotated into or out of closure with said seat; said seat having a pressure-relief bleed hole oriented in a predetermined direction relative to said nipple to direct any escaping water to one side of the needle-valve seat.

2. The pressure relief device of claim 1, wherein said nipple and said valve seat are brass and are welded or brazed to one another.

3. The pressure relief device of claim 1, wherein said nipple provide a straight and unobstructed flow path for water passing therethrough.

4. The pressure relief device of claim 1, wherein said bleed hole is oriented to be generally perpendicular to an axis of the nipple, to direct the escaping water in said predetermined direction to one side of the nipple, and the nipple is distinctively colored on opposite sides of said nipple.

5. The pressure relief device of claim 1, wherein said needle valve has a threaded stem and a key at an outer end of the stem.

6. The pressure relief device of claim 5, wherein said key is removable seated on said stem.

7. The pressure relief device of claim 1, wherein the threaded fittings on the ends of said nipple are of the same diameter and thread.

8. The pressure relief device of claim 7, one of said threaded fittings is male and the other is female.

* * * * *